United States Patent
Koda et al.

(10) Patent No.: US 12,288,120 B2
(45) Date of Patent: Apr. 29, 2025

(54) METHOD FOR MANUFACTURING DISPLAY BODY, DISPLAY BODY, AND METHOD FOR VERIFYING AUTHENTICITY OF DISPLAY BODY

(71) Applicant: TOPPAN INC., Tokyo (JP)

(72) Inventors: Soko Koda, Tokyo (JP); Akihito Kagotani, Tokyo (JP)

(73) Assignee: TOPPAN INC., Tokyo (JP)

( * ) Notice: Subject to any disclaimer, the term of this patent is extended or adjusted under 35 U.S.C. 154(b) by 287 days.

(21) Appl. No.: 17/826,541

(22) Filed: May 27, 2022

(65) Prior Publication Data

US 2022/0292326 A1 Sep. 15, 2022

Related U.S. Application Data

(63) Continuation of application No. PCT/JP2020/044934, filed on Dec. 2, 2020.

(30) Foreign Application Priority Data

Dec. 2, 2019 (JP) .................... 2019-218137

(51) Int. Cl.
*G06K 19/16* (2006.01)
*B42D 25/23* (2014.01)
(Continued)

(52) U.S. Cl.
CPC ............. *G06K 19/16* (2013.01); *B42D 25/23* (2014.10); *B42D 25/305* (2014.10);
(Continued)

(58) Field of Classification Search
CPC ...... G06K 19/16; G06K 7/1447; B42D 25/23; B42D 25/305; B42D 25/328; B42D 25/41; B42D 25/455
(Continued)

(56) References Cited

U.S. PATENT DOCUMENTS

2005/0072849 A1\* 4/2005 Jones ................... B42D 25/318
235/487
2005/0132194 A1 6/2005 Ward
(Continued)

FOREIGN PATENT DOCUMENTS

EP 3459756 A1 3/2019
JP 06-067592 A 3/1994
(Continued)

OTHER PUBLICATIONS

International Search Report (Form PCT/ISA/210); mailed Feb. 9, 2021 in corresponding PCT Application No. PCT/JP2020/044934; (2 pages) (2 pages English Translation).
(Continued)

*Primary Examiner* — Michael G Lee
*Assistant Examiner* — David Tardif
(74) *Attorney, Agent, or Firm* — STAAS & HALSEY LLP

(57) ABSTRACT

A display body includes a base material having a first region, a second region, and a third region. In the display body, the first region is formed with a code or an image of identification information, and the second region is formed with a hidden code containing information obtained by encoding at least a part of the identification information. An encrypted
(Continued)

ciphertext is recorded in the third region, and the ciphertext is generated from at least one of the code of the identification information and the hidden code.

16 Claims, 7 Drawing Sheets

(51) Int. Cl.
*B42D 25/305* (2014.01)
*B42D 25/328* (2014.01)
*B42D 25/41* (2014.01)
*B42D 25/455* (2014.01)
*G06K 7/14* (2006.01)

(52) U.S. Cl.
CPC ........... *B42D 25/328* (2014.10); *B42D 25/41* (2014.10); *B42D 25/455* (2014.10); *G06K 7/1408* (2013.01); *G06K 7/1447* (2013.01)

(58) Field of Classification Search
USPC .......................................................... 235/457
See application file for complete search history.

(56) References Cited

U.S. PATENT DOCUMENTS

| 2015/0036198 A1* | 2/2015 | Inokuchi | ............. G03H 1/0252 |
| | | | 359/2 |
| 2019/0084338 A1 | 3/2019 | Yamada | |

FOREIGN PATENT DOCUMENTS

| JP | 8-099490 A | 4/1996 |
| JP | 3198324 B | 6/2001 |
| JP | 2001-315472 A | 11/2001 |
| JP | 4677683 B2 | 2/2011 |
| JP | 2013-020084 A | 1/2013 |
| WO | WO 2017/200030 A1 | 11/2017 |
| WO | WO 2019/176967 A1 | 9/2019 |

OTHER PUBLICATIONS

Extended European Search Report issued in European Application No. 20896761.2 dated Nov. 6, 2023.

* cited by examiner

METHOD FOR MANUFACTURING DISPLAY BODY, DISPLAY BODY, AND METHOD FOR VERIFYING AUTHENTICITY OF DISPLAY BODY

CROSS REFERENCE TO RELATED APPLICATIONS

This application is a continuation application based on PCT International Patent Application No. PCT/JP2020/044934, filed on Dec. 2, 2020, which claims priority to Japanese Patent Application No. 2019-218137, filed on Dec. 2, 2019, in the Japan Patent Office. The contents of both the Japanese Patent Application and the PCT Application are incorporated herein by reference.

FIELD OF THE INVENTION

An embodiment of the present invention relates to a method for manufacturing a display body, a display body, and a method for verifying the authenticity of a display body.

Further, a reading method, an observation device, and a method for verifying authenticity relating to this display body are also referred to.

DESCRIPTION OF RELATED ART

Various identification (ID) cards such as a passport and a driver's license are known as display bodies containing personal information. Many ID cards display a face image and text information in order to visually provide personal information. In a case where the personal information is simply printed on the display body, the display body may be easily tampered with or forged.

As an anti-forgery method of the display body, Japanese Unexamined Patent Application, First Publication No. H6-67592 describes that a hologram transfer foil is applied to the display body to improve anti-tampering performance of the display body.

Japanese Patent No. 3198324 describes that a fluorescent light emitting material is used to impart personal information such that the personal information is transparent and invisible in visible light observation, but visible in ultraviolet light observation.

The anti-forgery technique described in Japanese Unexamined Patent Application, First Publication No. H6-67592 is already widely known, and additionally, the forgery is not difficult in a case of a general hologram that emits rainbow-colored diffraction light. Therefore, there is room for improvement.

Japanese Patent No. 4677683 describes, as a further anti-forgery method, that light having a specific wavelength is emitted to a hologram to verify authenticity using reproduction information displayed on the hologram.

In the technique described in Japanese Patent No. 4677683, the reproduction information is designed in advance and is invariant. Therefore, in a case where a forger becomes aware of the reproduction information, a hologram imitating the reproduction information may be produced, and there is still room for improvement.

Based on the above circumstances, an object of the present invention is to provide a display body capable of suitably preventing tampering and forgery with a simple configuration.

SUMMARY OF INVENTION

According to a first aspect of the present invention, a method for manufacturing a display body includes generating a hidden code from identification information, encrypting the hidden code and generating a ciphertext, forming at least one of a code and an image of the identification information on the base material by at least one of thermal transfer and laser engraving, forming the hidden code on the base material by thermal transfer or security printing, and recording the ciphertext on the base material by at least one of thermal transfer and laser engraving.

According to a second aspect of the present invention, a display body includes a base material having a first region, a second region, and a third region. Identification information is formed in the first region. A hidden code containing information obtained by encoding at least a part of the identification information is formed in the second region. An encrypted ciphertext is recorded in the third region. The ciphertext is generated from at least one of the code of the identification information and the hidden code.

According to a third aspect of the present invention, a method for verifying authenticity of a display body verifies whether or not the display body according to the first aspect is authentic.

The method for verifying the authenticity includes acquiring the identification information and the hidden code from the display body, and verifying whether or not the display body is authentic from the acquired identification information and hidden code.

The display body of the above aspect can suitably prevent the tampering and the forgery with the simple configuration. Further, under a specific observation condition, it is possible to verify the authenticity with a hidden code that exhibits a special visual effect and to additionally perform forensic verification with a ciphertext.

DETAILED DESCRIPTION OF THE PREFERRED EMBODIMENTS

Hereinafter, one aspect of the present invention will be described with reference to FIGS. 1 to 11.

An embodiment of the present invention is a group of embodiments based on a single invention of its own. Further, each aspect of the present invention is an aspect of the group of embodiments based on the single invention. Each configuration of the present invention may have each aspect of the present disclosure. Each feature of the present invention can be combined to form each configuration. Therefore, each feature of the present invention, each configuration of the present invention, each aspect of the present disclosure, and each embodiment of the present invention can be combined, and the combination exhibits a cooperative function and exerts a synergistic effect.

Figure 1:
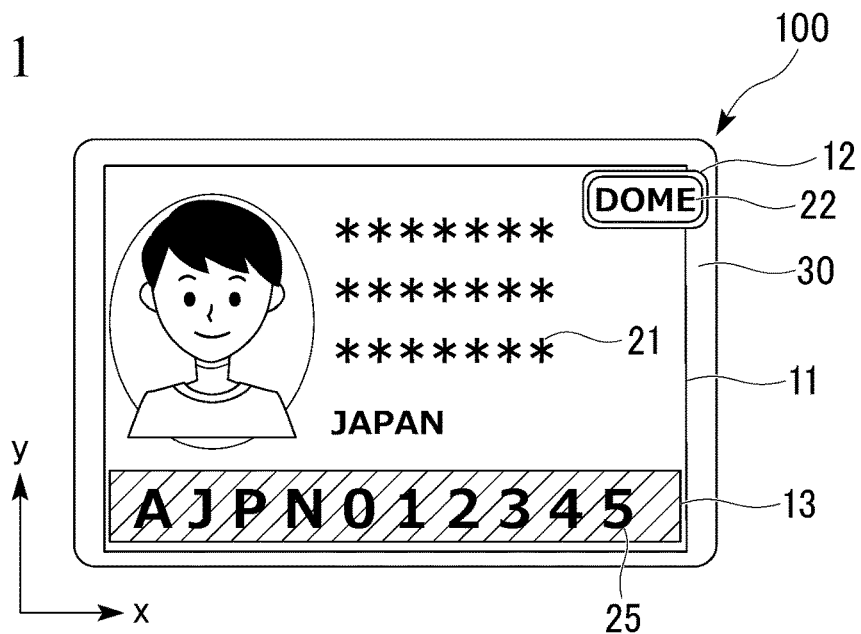
FIG. 1 is a plan view conceptually showing a display body according to a first embodiment of the present invention.

FIG. 1 is a plan view conceptually showing a display body 100 in the present embodiment. The display body 100 has a first region 11, a second region 12, and a third region 13.

At least one of a code and an image of identification information 21 is formed in the first region 11. This code is visible. This code can also be identified by a reader. The reader may include a line sensor or an image sensor. The reader may also include a light source. As shown in FIG. 1, the visible code may be a combination of a text, a character, a number, and a symbol. These codes are visually readable. That is, the identification information 21 can be recorded as a visually readable code. Further, the image of the identification information 21 may be a face image or a signature. The identification information 21 may be personal information of an owner of the display body 100. The personal information of the owner is a name, date of birth, country of origin, place of origin, and personal identification number. These pieces of personal information can be recorded as the code by combining the character, the number, the symbol, and the like. In FIG. 1, the face image of the owner is recorded as the identification information in an elliptical portion in the first region 11. The identification information may be biological information of the owner. The biological information may be the face image, the signature image, and a biological feature amount. The biological feature amount can be recorded as the code in the first region 11. In the identification information formed in the first region 11, this face image also constitutes a part of the identification information. The identification information can be converted into a code according to a fixed rule. That is, the code can be generated from the identification information. This code may be digital data. The digital data may be 1 byte or more and 256 bytes or less. In a case where an image is converted into digital data, the digital data may be 1 Mbyte or more and 1 Gbyte or less. The image may be the digital data of 10 kbytes or more and less than 1 Mbyte. The code and the image data may have a fixed length or a variable length. In a case of the fixed length, the data is easily processed. In a case of the variable length, the amount of data can be reduced. The identification information is discretized when the information is converted into the code of digital data. The code recorded in the first region 11 can be interpreted to obtain the identification information. The code is not identical to the identification information. However, with the code generated from the identification information, a single specific object or a plurality of specific objects can be identified and sorted from a specific group. In a case where the identification information is a serial number of a product, a target product can be specified from a plurality of products. In a case where the identification information is the personal information, an individual can be specified from the code generated from the identification information.

A ciphertext can be recorded as the code. The code and the image can be formed as a shape, a size, and a disposition of an area with a specific physical characteristic value. The formed code exists as a substance or a space surrounded by a substance. The image can also be recorded as a shape, a size, and a disposition of an area with a specific physical characteristic value. The recorded image exists as a substance or a space surrounded by a substance.

A base material 30 forming the display body 100 is, for example, a polycarbonate sheet. A polycarbonate resin of the polycarbonate sheet is carbonized by heat generated by a laser beam. Therefore, at least one of the code and the image of the identification information can be formed in the first region by the laser beam. That is, at least one of the code and the image of the identification information 21 can be formed in the first region by laser engraving. Further, since the polycarbonate resin of the polycarbonate sheet is carbonized by the heat generated by the laser beam, the ciphertext can be recorded in the third region by the laser beam. That is, the ciphertext can be recorded by the laser engraving. Since these recorded codes are difficult to erase, it is difficult to rewrite and tamper with the once recorded codes.

At least one of the code and the image of the identification information 21 can be formed by thermal transfer. The identification information 21 may be thermally transferred directly to the base material 30. Alternatively, a base material to which the identification information 21 is thermally transferred in advance may be laminated on another base material. As described above, the display body 100 may be formed. In the thermal transfer of the identification information 21, thermal transfer can be partially performed on the base material by a thermal head, using at least one of a thermal transfer ribbon on which a transferable ink layer is formed and a hologram transfer foil on which a thermally transferable hologram is formed. Therefore, at least one of the code and the image of the identification information 21 is formed in the first region. In particular, in a case where a sublimation-type thermal transfer ribbon is used, a high-quality image can be formed. The hologram transfer foil may be formed with a hologram structure that reflects diffraction light corresponding to red, green, and blue. The hologram structure that reflects the diffraction light corresponding to red, green, and blue may be sequentially formed in a longitudinal direction of the transfer foil. With the above, a color image can be formed with one hologram transfer foil. It is difficult to form the face image of the owner with the hologram transfer foil. Therefore, the face image of the owner is formed with the hologram transfer foil as the image of the identification information, and the image is visually compared with the owner. It is possible to visually verify whether or not there is impersonation. Further, with the partial thermal transfer, to the base material by the thermal head, of at least one of the thermal transfer ribbon on which the thermally transferable ink layer is formed and the hologram transfer foil on which the thermally transferable hologram is formed, a ciphertext 25 can be recorded in the third region. In other words, with the partial thermal transfer, by the thermal head, of at least one of the transfer foil on which the thermally transferable ink layer is formed and the transfer foil on which the thermally transferable hologram is formed, the ciphertext 25 can be recorded in the third region.

Alternatively, at least one of the code and the image of the identification information 21 may be printed and formed by inkjet printing. The ciphertext 25 may also be printed and recorded by inkjet. The inkjet printing is simple.

At least one of the laser engraving and the thermal transfer is possible on the base material 30. The inkjet printing may also be possible.

In a case where the laser engraving is performed directly on the base material 30 or a printed portion is located inside the base material by overlapping, the identification information 21 is easily destroyed when the display body 100 is forged or tampered with. Therefore, it is easy to verify whether there is forgery or tampering.

Figure 3A:
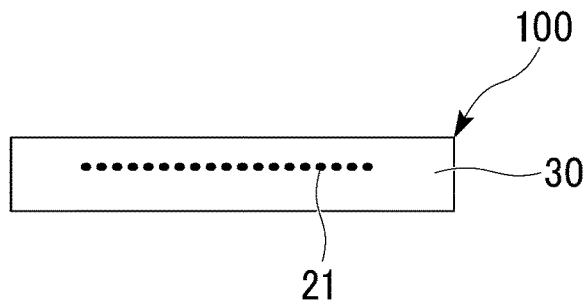
FIG. 3A shows an example of a positional relationship between a base material and identification information.
Figure 3B:
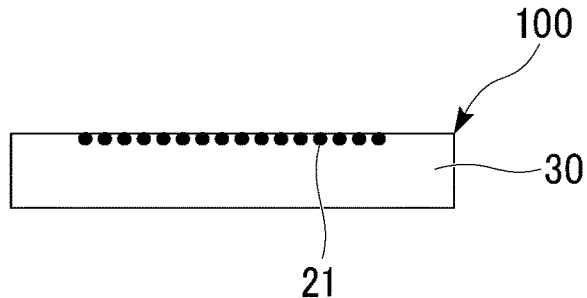
FIG. 3B shows an example of the positional relationship between the base material and the identification information.

FIG. 3A schematically shows an example in which the identification information 21 is located inside the base material 30. FIG. 3B schematically shows an example in which the identification information 21 is located on a surface of the base material 30. The identification information 21 can also be formed inside the base material 30 by condensing the laser beam inside the base material 30.

In the display body 100, as shown in FIG. 1, a part of the second region 12 and the third region 13 are located in the first region 11 and overlap each other in a plan view of the display body 100. With the above, it becomes necessary to consider a positional relationship between the second region 12 and the third region 13 in forgery and tampering, in addition to structures of the second region 12 and the third region 13 described below. Therefore, the forgery and the tampering become more difficult.

An overlapping method of the regions 11, 12, and 13, a size of an overlapping area, and the like can be determined according to user's visibility.

The first region 11, the second region 12, and the third region 13 may not overlap. With the above, the visibility of each of the regions can be improved. A security patch may be further overlapped on any one of the regions. The security patch may be a hologram film having a predetermined shape obtained by thermally transferring the thermally transferable hologram transfer foil on which a hologram structure is formed. The hologram film may be a lamination of a layer on which the hologram structure is formed and an adhesive layer. An outer shape of the security patch may be a circle, an ellipse, or a rectangle with rounded corners. A shape of the security patch can be determined by a shape of a die head when the thermal transfer is performed. The thermal transfer of the hologram transfer foil with the die head is also referred to as hot stamping.

A hidden code 22 is formed in the second region 12. The ciphertext 25 is recorded in the third region 13. In the present embodiment, contents of the hidden code 22 and the ciphertext 25 are identical to a part of the identification information 21. The hidden code 22 recorded by the laser engraving or the printing and reproduction images 24 of the hidden code 22 formed of the hologram film described below may be aligned so as to completely overlap each other in a plan view. This printing may be security printing described below. In the example of FIG. 1, the ciphertext 25 formed by the laser engraving or the inkjet printing and reproduction images 27A and 27B of the ciphertext 25 formed by the hologram film described below are aligned so as to overlap each other in a plan view.

Specifically, the identification information 21 is a character string code obtained by combining symbols, numbers, and alphabets shown in FIG. 1. The hidden code 22 is a character string "DOME". The ciphertext 25 is "AJPN012345" which is a combination of characters and numbers.

The hidden code may be formed by only the hologram film. The ciphertext 25 may only be recorded by the laser engraving or the inkjet printing. The hidden code may be formed by only the hologram film, and the ciphertext 25 may be formed only by the laser engraving or the printing. Accordingly, it is possible to achieve both forgery resistance and ease of manufacture. The hidden code 22 may be formed by the security printing. The security printing may be a latent image of thin lines formed in different directions. In the latent image of the thin lines, the recorded code can be visually recognized by reflection observation from a specific direction, transmission observation, and superposition of a universal filter. Further, the security printing may be invisible ink printing or variable ink printing. The variable ink may be a pearl ink, a cholesteric liquid crystal ink, or a magnetic ink. The invisible ink may be a fluorescent ink. The fluorescent ink can be visualized by irradiating with an ultraviolet ray. Further, the invisible ink may be an infrared absorbing ink. The infrared absorbing ink can be visualized by a night vision device. Further, the security printing may be printing in which a plurality of regions of a nematic liquid crystal having different orientations for each region are formed. This is security printing on the nematic LCD. The security printing on the nematic LCD can be visualized with a polarizing plate. The security printing can be achieved by gravure printing, gravure offset printing, or screen printing. That is, the hidden code 22 is formed of at least one of the hologram film that exhibits a special visual effect under a specific observation condition and the security printing that has a special visual effect.

With the above special visual effect of the hidden code 22, it is possible to verify the authenticity of the display body on which the hidden code 22 is formed. This authenticity verification is an OVART or COVERT verification.

The hidden code 22 in the present embodiment is either the character string "DOME" or "INTE". The "DOME" represents "Domestic" and indicates that the owner has a nationality of a country in which the display body 100 is used (JAPAN in the example of FIG. 1). The "INTE" represents "International" and indicates that the owner has a nationality other than the country in which the display body 100 is used (JAPAN in the example of FIG. 1). The hidden code 22 may be any code as long as the code can distinguish between the country in which the display body 100 is used and the nationality of the owner, and is not limited to the above "DOME" and "INTE" pair.

In this example, the hidden code 22 is information obtained by encoding a part of the personal information related to the owner of the display body 100. The encoded information is a three-character country code defined by ISO 3166-1 alpha-3, a two-character country code defined by ISO 3166-1 alpha-2, a three-digit number country code defined by ISO 3166-1 numeric, or the like. Alternatively, the encoded information is a country code based on an IOC code set by the International Olympic Committee.

The hidden code 22 is not limited to the information indicating the nationality of the owner of the display body 100. For example, the hidden code 22 may be a region code assigned to a prefecture or state defined by ISO 3166-2, a gender code defined by ISO 5218, a currency code defined by ISO 4217, a language code defined by ISO 639, or the like. Further, the hidden code 22 may be a code uniquely determined.

The hidden code 22 is information to which the owner of the display body 100 belongs or that is distinguishable and may be associated with the identification information 21 of the owner. As the hidden code 22, the above various codes may be used as they are, or a hash value generated by a hash function from the above various codes or at least one of the code and the image of the identification information may be used. The hash function is preferably a cryptographic hash function. That is, the hidden code 22 is preferably the hash value generated by the cryptographic hash function. The cryptographic hash function can be defined as having pre-image resistance, second preimage resistance, and strong collision resistance. This hash function may be a Merkle-Damgard construction (second a in Damgard is an A lowercase character with an upper ring). With the above, the hash value can be easily generated even in a case where the identification information 21 and the hidden code 22 have the variable length. The hash function that generates the applicable hash value may be any one of MD5, SHA-244, or SHA-256, or a hybrid thereof.

The hash value generated by the hash function has preferably the fixed length. In a case where the hash function has the fixed length, the code of the hidden code 22 can be recorded in a set region. In this case, a value input to the hash function may have the fixed length or the variable length.

When the ciphertext and the hidden code are generated, an encrypted code may be used as the code generated by using the hash function described above.

A public key cryptosystem, a common key cryptosystem, or a hybrid cryptosystem can be used for the encryption code and generating the ciphertext and the hidden code.

In a case where the ciphertext is generated, by using the public key cryptosystem, from the identification information using a private key and recorded as the encrypted code in the third region, authentication and the authenticity verification of the display body 100 can be performed offline as described below. The offline authenticity verification of the display body can be performed by storing a public key in a memory in a device or application that authenticates the display body 100 and decrypting the ciphertext using the stored public key. In a case where the public key cryptosystem is used, the cryptosystem may be used not only for the offline verification but also for online verification.

More specifically, all of the identification information are encrypted with the private key to generate a code, and the generated code is recorded in the third region. The code is decrypted with the public key, and the authenticity of the display body can be verified based on whether or not the decrypted code is identical to the identification information and the hidden code. Further, the hash value generated by the hash function from the identification information is encrypted with the private key to generate a code, and the generated code is recorded in the third region. The code is decrypted with the public key, and the authenticity of the display body can be verified based on whether or not the decrypted code is identical to the hash value, which is generated by the hash function, of the identification information or the hidden code. The authenticity verification of the display body based on whether or not the information decrypted from the ciphertext is identical to the identification information and the hidden code may be forensic verification.

The applicable public key cryptosystem is any one of an RSA cryptosystem, an elliptic curve cryptosystem, or a hybrid thereof. Further, the public key cryptosystem may be a lattice cryptosystem. The key length of the public key is preferably any one of 1024 bits, 2048 bits, 3072 bits, or 4096 bits. The key length can be selected according to a level of security required for the display body.

In a case where the ciphertext or the hidden code is generated by using the common key cryptosystem, the cryptosystem can be used for online verification described below to perform the authentication and the authenticity verification of the display body 100. Further, even in a case where the ciphertext or the hidden code is generated by using the hybrid cryptosystem, the cryptosystem can be used for online verification described below to perform the authentication and the authenticity verification of the display body 100.

A block cipher, a stream cipher, or a hybrid thereof can be applied as the common key system. An applicable block cipher is AES, Camellia, or a hybrid thereof. An applicable stream cipher is RC4. A key length may be 128 bits, 192 bits, or 256 bits.

The ciphertext 25 in the present embodiment is composed in combination of a hash value "A" of at least one of the code and the image of the identification information 21, a character string "012345" in which the code of the identification information 21 is encrypted, and a Japanese code "JPN" in ISO 3166-1 alpha-3. The ciphertext 25 may include a character length. Further, the ciphertext 25 may be a ciphertext in which the code of the identification information 21 is encrypted. Accordingly, the authenticity can be verified based on whether or not the code obtained by decrypting the ciphertext is identical to the code of the identification information 21. Further, the ciphertext 25 may be a ciphertext in which the recorded hidden code 22 is encrypted. In this case, the recorded hidden code 22 may be the hash value of the identification information 21. In particular, it is easy to prevent the impersonation by assuming that this hash value is generated from the cryptographic hash function. In a case where the recorded hidden code 22 has the fixed length, the encrypted code can also have the fixed length. In this case, an encryption program and a decryption program are easy to implement.

Figure 2A:
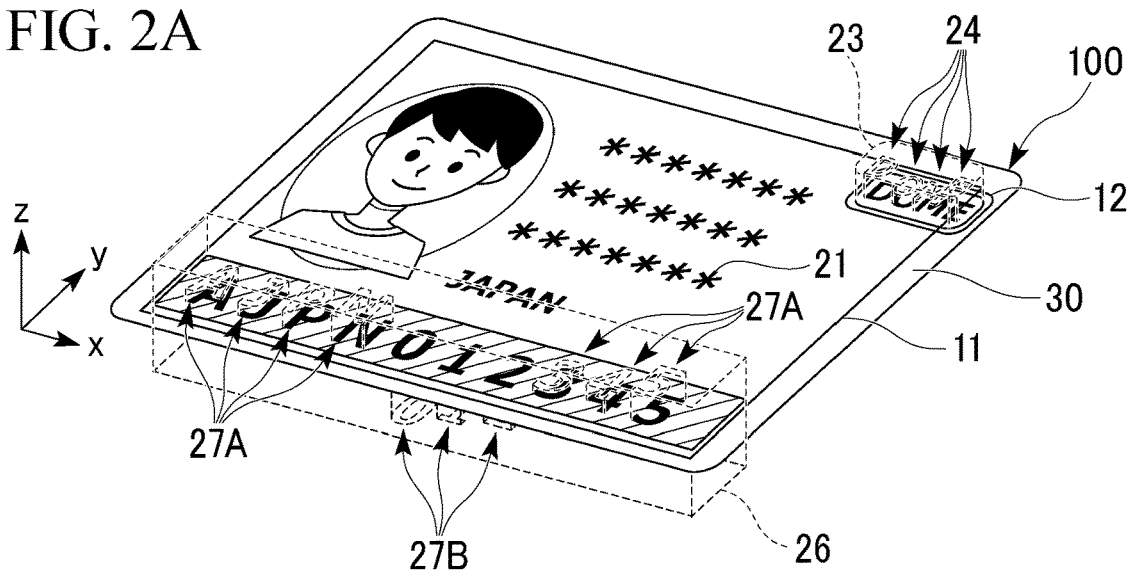
FIG. 2A is a perspective view of the display body of FIG. 1.
Figure 2B:
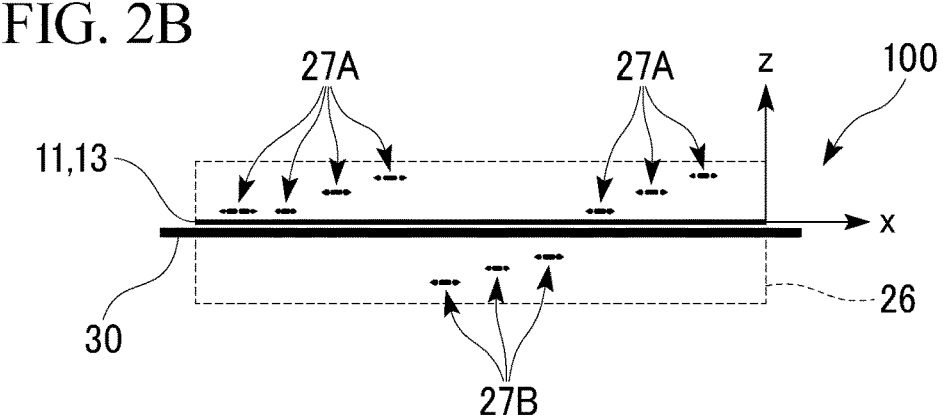
FIG. 2B is a schematic cross-sectional view of the display body of FIG. 1, which schematically shows positions of reproduction images.

The hologram film is thermally transferred to the third region 13, and the ciphertext 25 is recorded as the hologram structure of the hologram film. Therefore, the ciphertext 25 is displayed as a hologram reproduction image. As shown in FIGS. 2A and 2B, the hologram reproduction image of the ciphertext 25 is visually recognized as being located in a reproduction image space 26 away from the base material 30 in a normal direction Z of the display body 100. In the examples shown in FIGS. 2A and 2B, the reproduction images 27A of "A", "J", "P", "N", "3", "4", and "5" are formed in the reproduction image space 26 on an upper side (Z>0) of the base material 30, and the reproduction images 27B of "0", "1", and "2" are formed in the reproduction image space 26 on a lower side (Z<0) of the base material 30.

The hologram reproduction image of the ciphertext 25 can be acquired by an observation method and a detection device of the display body described below.

As shown in FIG. 2B, both the reproduction images 27A and 27B are formed at a plurality of positions having different distances from the base material 30 in the normal direction Z, but the distances from the base material 30 may be unified. The distance between the reproduction image and the base material 30 may form a part of the ciphertext 25.

That is, the ciphertext 25 may include a code in which the identification information 21 is encrypted and information on the distance between the hologram reproduction image of this code and the base material 30. The distance between the hologram reproduction image and the base material 30 is preferably quantized to be discrete. The ciphertext 25 may be recorded by the laser engraving or the inkjet printing. The ciphertext may be recorded as a one-dimensional code or a two-dimensional code. With the above, it becomes easy for the reader to read. An applicable one-dimensional code is a barcode. An applicable two-dimensional code is a QR code (registered trademark). The ciphertext may be recorded on an IC chip built in the display body. A contact terminal is provided on a surface of the display body, and the built-in IC chip may be connected to the contact terminal on the surface of the display body. Further, an antenna may be built in the display body, and the built-in IC chip may be connected to the antenna. The IC chip built in the display body may be authenticatable by itself. Accordingly, electronic authentication is possible. The display body provided with the built-in antenna and IC chip can be used as an RFID.

The second region 12 also has a hologram structure, and the hidden code 22 is displayed as the hologram reproduction image.

Figure 4A:
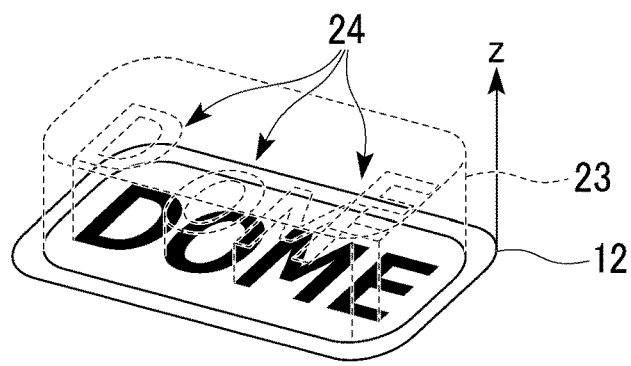
FIG. 4A is an enlarged schematic view of a second region of the display body of FIG. 1.
Figure 4B:
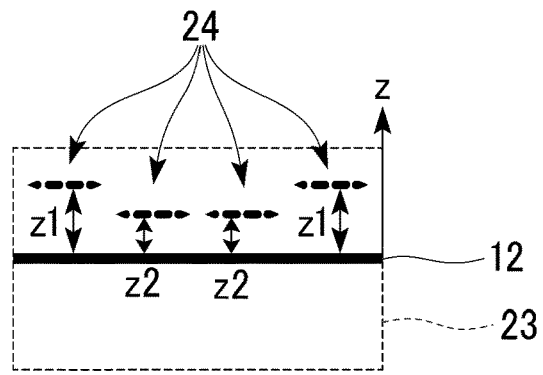
FIG. 4B schematically shows a position of a hologram reproduction image in a second region.

FIGS. 4A and 4B show a reproduction position of the hologram reproduction image of the hidden code 22. The reproduction images 24 are formed on the upper side of the base material 30 in a reproduction image space 23. The distance between the reproduction image corresponding to each character and the base material 30 is any one of a distance z1 or a distance z2 shorter than the distance z1, but the distances may all be different. The distance between the reproduction image and the base material 30 may form a part of the hidden code 22. That is, the hidden code 22 may include a character in which a part of the personal information is encoded and information on the distance between the hologram reproduction image of this character and the base material 30. The distance is quantized to be discrete. Therefore, the information can be recorded as digital data.

The distance between the reproduction image and the base material can be set as appropriate by the hologram structure. The hologram structure formed in the second region 12 and the third region 13 may be a Lippmann-type volume hologram or a hologram structure having a fine uneven structure. The hologram structure having the uneven structure may be a computer hologram structure in which the reproduction image is designed in advance and a diffraction grating hologram pattern is calculated from the designed reproduction image. These hologram structures can form film-like optical phase information for forming the reproduction image as the fine uneven structure. Further, the positions of the reproduction images 24 of the above hidden code and the reproduction images 27A and 27B of the ciphertext can be precisely controlled.

In a case where the Lippmann-type volume hologram is employed for the hologram structure, the hologram structure can be formed by emitting, to a light-responsive photopolymer, object light from the hidden code and ciphertext to be formed and reference light for reproducing the object light and recording interference fringes thereof on the photopolymer. The Lippmann-type volume hologram may be formed by calculating the optical phase information of the object light from the hidden code and the ciphertext in advance by a computer, displaying the optical phase information by a spatial optical phase modulator, and using light transmitted or reflected by the spatial optical phase modulator as the object light.

As a material of the volume hologram, the photopolymer whose refractive index is modulated by being photosensitized may be used. A type of the photopolymer may be a photocrosslinking type or a photopolymerization type. An actual example of the photocrosslinking type is the photopolymer containing polyvinylcarbazole as a main component. The photopolymerization type tends to have high sensitivity due to a chain reaction during photosensitization. It is easy to increase a difference in the refractive index for the photocrosslinking type. As a type of the photopolymerization type, a wet type that requires a development treatment or a dry type that does not require the development treatment may be used. The dry photopolymer may use a pair of materials having different refractive indexes and low compatibility as a main component. An actual example of the pair of main components is a vinyl acetate compound and an acrylic acid ester compound, or an epoxy compound and an acrylic acid ester compound, and one of the compounds may be a polymer. It is easy to make the difference in the refractive index for the photopolymer containing the vinyl acetate compound and the acrylic acid ester compound as a pair of main components. It is easy to increase the durability for the photopolymer containing the epoxy compound and the acrylic acid ester compound as a pair of main components. An actual example of the wet type is a mixture of polyvinylpyrrolidone and a monomer. In this mixture, since a portion having a weak light intensity dissolves in a developing solution to form a void, it is easy to increase the difference in the refractive index. The volume hologram can be duplicated by emitting a laser to a master hologram, photosensitizing interference fringes of reflected light (object light) thereof and the emitted laser light (reference light) on the photopolymer, and modulating the refractive index of the photopolymer. (Contact Copy Method)

In a case where the computer hologram is employed for the hologram structure, the hologram film is obtained by calculating the optical phase information for recording the hidden code and the ciphertext in advance by the computer, forming the fine uneven structure for realizing the optical phase information by a laser drawing method, an electron beam drawing method, an ion beam drawing method, or the like, and pressing the fine uneven structure as an original plate against a film material coated with a thermoplastic resin, a thermocurable resin, or a photocurable resin for duplication.

The fine uneven structure may include a fine uneven structure described below, which is disclosed in PCT/JP2017/020049 (International Publication No. WO2017/209113A1).

As an example, the fine uneven structure of the present embodiment has a phase angle recording region and a phase angle non-recording region. In the fine uneven structure, a region other than the phase angle recording region is the phase angle non-recording region. The phase angle non-recording region is, in one example, a mirror surface.

A positional relationship of each configuration will be described using an XYZ orthogonal coordinate system. The fine uneven structure is disposed along an XY plane.

In a case where light is incident from a direction intersecting the fine uneven structure, the incident light is modulated by the fine uneven structure. As a result, the reproduction image can be obtained. The reproduction image is an image of a plurality of reproduction points. The reproduction point is obtained at a position separated from the fine uneven structure in a Z direction. The range in which the reproduction image in a viewing angle direction is reproduced in a case where the fine uneven structure is viewed from a reproduction point of interest is referred to as a viewing angle θ. In the following description, the viewing angle direction is an X direction or a Y direction.

On the fine uneven structure, each calculation element section is defined according to the viewing angle θ from each reproduction point at which the reproduction image is reproduced. As described above, since the calculation element section is defined independently of the phase angle recording region and the phase angle non-recording region, the calculation element section usually overlaps with the phase angle recording region and the phase angle non-recording region individually.

There are a plurality of reproduction points. Therefore, there are the same number of calculation element sections as the reproduction points corresponding to each of the plurality of reproduction points.

The reproduction points are disposed apart from the fine uneven structure. A distance of the reproduction point from the fine uneven structure in the Z direction is preferably 5 mm or more and 25 mm or less. The reproduction point may be reproduced from the fine uneven structure to an observer side and may be reproduced to a side opposite to the observer of the fine uneven structure. In both cases, the distance of the reproduction point from the fine uneven structure can be defined in the same manner.

The viewing angle θ from the reproduction point is defined by the following equation (1).

$$\theta < (A/m) \qquad (1)$$

Here, in a case where $(\lambda/2d) \leq 1$, $A = a\square \sin(\lambda/2d)$, where λ is a wavelength of light, d is a disposition spacing in the viewing angle direction of a unit block, and m is a real number of 3 or more. Specifically, the wavelength λ of light is 555 nm, which is maximum relative luminosity of human beings in visible light. The disposition spacing d may be a distance between centers of unit blocks. The disposition spacing of the central unit blocks is 10 nm or more and 200 nm or less.

The viewing angle θ is determined by a range in the X direction in a case where the fine uneven structure is viewed from the reproduction point of interest and becomes ½ of an angle 2θ, which is formed by a minimum value Xmin in the X direction, the reproduction point of interest, and a maximum value Xmax in the X direction. The X direction and the Y direction each correspond to an X coordinate axis and a Y coordinate axis of Euclidean coordinates with one direction in which the fine uneven structure extends as the X direction and a direction orthogonal to the X direction as the Y direction.

The viewing angle θ in a case where the viewing angle direction is the Y direction is also defined in the same manner. That is, the viewing angle θ is determined by a range in the Y direction in a case where the fine uneven structure is viewed from the reproduction point of interest and becomes ½ of an angle 2θ, which is formed by a minimum value Ymin in the Y direction, the reproduction point of interest, and a maximum value Ymax in the Y direction. Therefore, the disposition spacing d of the unit block corresponds to a disposition spacing dx of the unit block in the X direction in a case where the viewing angle direction is the X direction, and corresponds to a disposition spacing dy of the unit block in the Y direction in a case where the viewing angle direction is the Y direction.

Therefore, the calculation element section is generally a square or a rectangle. However, the calculation element section may be a polygon other than a quadrangle, a circle, or an ellipse. A hexagon is particularly suitable for the polygon, in addition to the square and the rectangle. In a case where the calculation element section is other than the square or the rectangle, the minimum value (lower limit value) in the X direction of the calculation element section is Xmin, and a maximum value (upper limit value) in the X direction of the calculation element section is Xmax. Similarly, the minimum value in the Y direction of the calculation element section is Ymin, and the maximum value in the Y direction of the calculation element section 16 is Ymax.

In a case where the shape of the unit block is the square or the rectangle, the square or the rectangle is actually a rounded square with rounded corners. The unit block may be fused with an adjacent unit block. In this case, even though the shape of each unit block is a rounded square, a shape in which the unit blocks are fused does not become the rounded square and is deformed. However, an optical effect does not change even though the shape is deformed by the fusion. The unit blocks are preferably disposed in an orderly manner. The ordered disposition may be a disposition at spacings with a certain range or a disposition at equal spacings. A typical ordered disposition is a square disposition or a hexagonal disposition.

As can be seen from equation (1) described above, the viewing angle θ is less than A. In a case where light passes through the phase component and is diffracted, no diffraction exceeding A occurs theoretically. Therefore, in a case where the hologram calculation is performed by using the computer, a calculation range may be limited with the viewing angle θ as an upper limit. The limitation of the calculation range in this manner shortens a calculation time. Even in a case where the calculation is performed for a range exceeding the viewing angle θ, the result only contributes as noise because the calculation of the diffraction that does not exist theoretically is performed. However, in the above calculation, since the calculation in the range exceeding the viewing angle θ is not performed, noise is not superimposed when the reproduction image is reproduced on the reproduction point.

Both the phase angle recording region and the phase angle non-recording region include a plurality of unit blocks. The phase angle is calculated based on the phase component by the computer for the unit block included in a region (overlap region) that overlaps with the calculation element section among the phase angle recording regions. The calculated phase angle is recorded in the corresponding unit block included in the overlap region.

The fine uneven structure of the present embodiment is visible and authenticatable. In a case where an optical structure having such a fine uneven structure as a relief structure is tilted by a certain amount or more and observed from outside the range of the above viewing angle θ, the reproduction image disappears due to the relief structure.

Further, the above reproduction image is reproduced only by a point light source. Therefore, the reproduction image disappears under diffuse lighting.

The viewing angle θ is preferably 5 degrees or more from the viewpoint of visibility of the reproduction image and is preferably 15 degrees or less from the viewpoint of facilitating the disappearance of the reproduction point.

The hologram structure with the fine uneven structure can be formed by, using an uneven structure formed by laser or electron beam as a resist plate, performing nickel electrocasting on the resist plate to make a nickel stamper and embossing the resin with the stamper. This hologram structure is formed on the hologram transfer foil. Therefore, it is possible to obtain a hologram transfer foil on which the hologram structure is formed. With the thermal transfer of this hologram transfer foil, it is possible to dispose the hologram film on which the hologram structure is formed in each region.

A reflective layer of metal may be formed on the hologram structure having the fine uneven structure. The metal of the reflective layer is aluminum (Al), gold (Au), silver (Ag), chromium (Cr), nickel (Ni), or an alloy thereof. This improves the brightness of the reproduction image reproduced by the hologram structure having the fine uneven structure formed on the hologram film. Accordingly, the reproduction image of the hidden code or the ciphertext becomes brighter, and the verification is more easily performed. The hologram structure having the fine uneven structure is referred to as a relief hologram.

A reflective layer of a metal compound may be formed on the hologram film on which the hologram structure having the fine uneven structure is formed. The metal compound may be a metal sulfide or a metal oxide. An applicable metal sulfide may be a zinc sulfide. Applicable metal oxides are a titanium dioxide, a zirconia, a zinc sulfide, and an aluminum oxide. The reflective layer of the metal compound has light transmission. With the reflective layer having light transmission, it is possible to visually recognize the identification information 21 under the second region 12 even though the second region 12 is formed on the first region where the identification information 21 is formed.

The reflective layer of metal and the reflective layer of a metal oxide can be formed by physical deposition. An applicable physical deposition is vacuum deposition or sputtering. The reflective layer of the metal oxide may be formed by chemical deposition. Further, the reflective layer may be formed by a wet coating technique such as a sol-gel method.

In the display body 100, the second region 12 and the third region 13 may be disposed anywhere as long as the regions can be visually recognized in a plan view. Positions to be disposed may be different between the second region 12 and the third region 13.

Figure 5A:
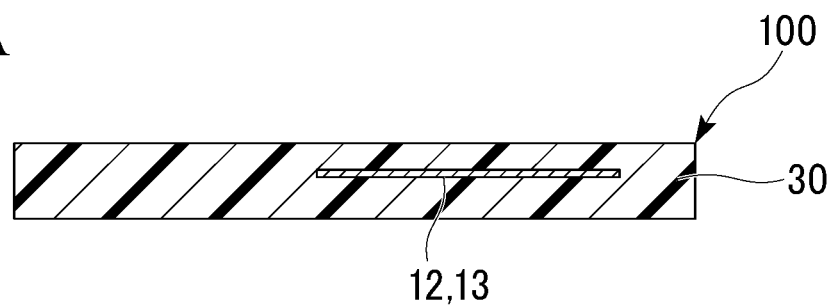
FIG. 5A shows an example of positions of the second region and a third region in the display body of FIG. 1.

As shown in FIG. 5A, in a case where the second region 12 or the third region 13 is disposed inside the base material 30, the base material 30 itself is required to be destroyed in order to falsify the second region and the third region. Therefore, the above disposition leads to prevention of falsification and the like, and anti-forgery performance is improved.

The configuration shown in FIG. 5A can be formed by, for example, forming or attaching the second region 12 and the third region 13 in advance to a plurality of resin sheets for forming the base material 30 and integrating the resin sheets with each other by hot pressure laminating in a state where the second region 12 and the third region 13 face other resin sheets.

Figure 5B:
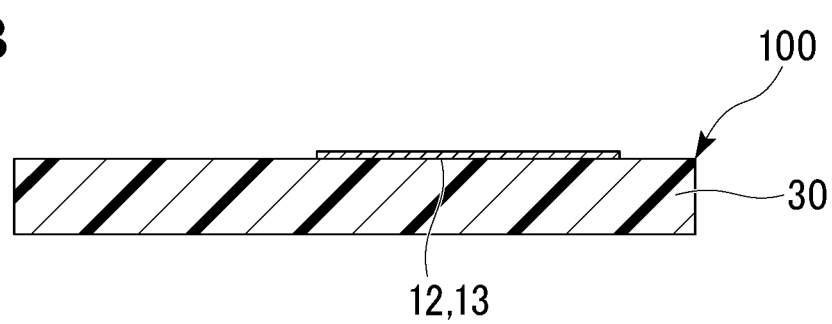
FIG. 5B shows an example of the positions of the second region and the third region in the display body of FIG. 1.

As shown in FIG. 5B, in a case where the second region 12 or the third region 13 is disposed on the surface of the base material 30, the base material 30 is formed, and then the second region 12 and the third region 13 including owner information of the display body 100 can be continuously formed. Therefore, it is possible to improve the manufacturing efficiency of the display body 100. In this case, the first region 11 may be disposed on the surface of the base material 30. Further, a display body in which the second region 12 is formed in advance on the base material 30 may be selected according to the identification information. This can improve the productivity of the display body. The third region 13 may be provided on a back surface.

In the case of the configuration shown in FIG. 5B, an adhesive material may be disposed on the base material 30, and a medium to be the second region 12 or the third region 13 may be attached to the base material 30. Alternatively, an adhesive layer may be provided on the medium to be the second region 12 or the third region 13, and the medium may be attached to the base material 30.

Figure 5C:
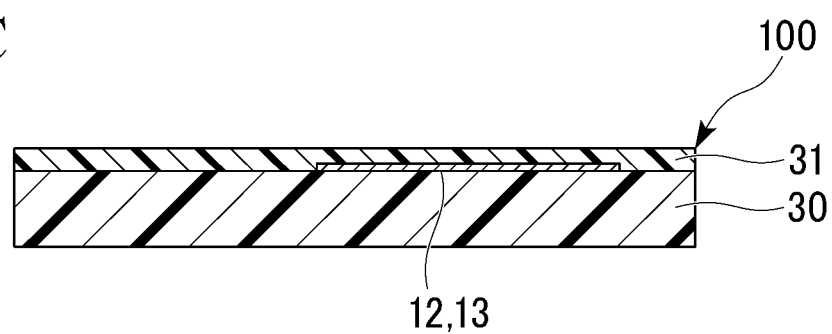
FIG. 5C shows an example of the positions of the second region and the third region in the display body of FIG. 1.

As shown in FIG. 5C, an intermediate transfer foil 31 on which the second region 12 or the third region 13 is formed may be attached to the base material 30 to form the display body 100. In this case, since the intermediate transfer foil 31 and the base material 30 are bonded on the entire surface, an adhesion state of the second region 12 or the third region 13 is stable and difficult to peel off.

A method for manufacturing the display body 100 will be described. Each display body 100 has the same basic shape and appearance, but the recorded identification information 21 and the contents of the ciphertext 25 are different one by one. Therefore, it is necessary to prepare individual information to be recorded each time in order to manufacture one display body. Further, the hidden code 22 is not identical for each card.

Figure 6:
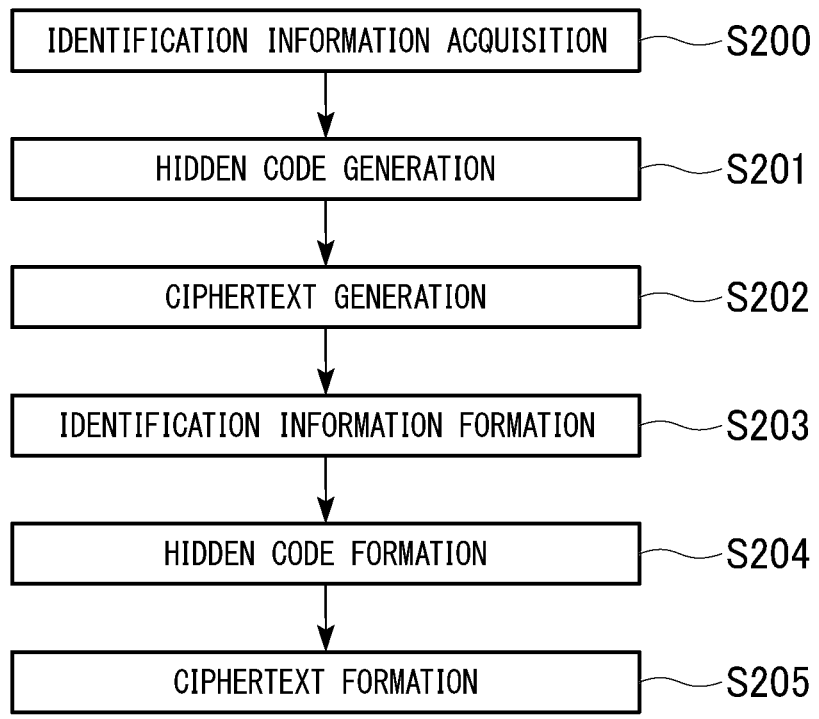
FIG. 6 is an example of a process flow related to a method for manufacturing the display body.

FIG. 6 shows an example of a process flow in manufacturing the display body 100.

First, in step S200, the identification information 21 is acquired. For example, in a passport issuing device, an ID card issuing device, or the like, individual information about a user who is a target of issuance of the display body 100 is selected and input to execute step S200. Here, at least one of the code and the image of the identification information 21 is also generated. With preparation of an input form, format, or the like in advance, it is possible to easily acquire and recognize the identification information.

In step S201, the hidden code 22 is generated from at least one of the code and the image of the identification information 21 acquired in step S200.

In step S202, at least one of the identification information code and the hidden code is encrypted to generate the ciphertext 25. In a case where the ciphertext 25 is decrypted, the decrypted ciphertext is identical to a part or all of at least one of the identification information code and the hidden code. That is, the ciphertext 25 is associated with at least one of the identification information code and the hidden code.

In step S203, at least one of the code and the image of the identification information 21 is formed in the first region 11 of the display body 100. The formation is performed by at least one of the thermal transfer and the laser engraving, as described above. Further, the formation may be performed by the inkjet printing.

In step S204, the hidden code 22 is formed in the second region 12 of the display body 100.

In step S205, the ciphertext 25 is recorded in the third region 13 of the display body 100.

In the flow of FIG. 6, either step S201 or step S202 may be performed first. Steps S203, S204, and S205 may be performed in any order and timing as long as the corresponding individual information has been acquired.

Figure 7:
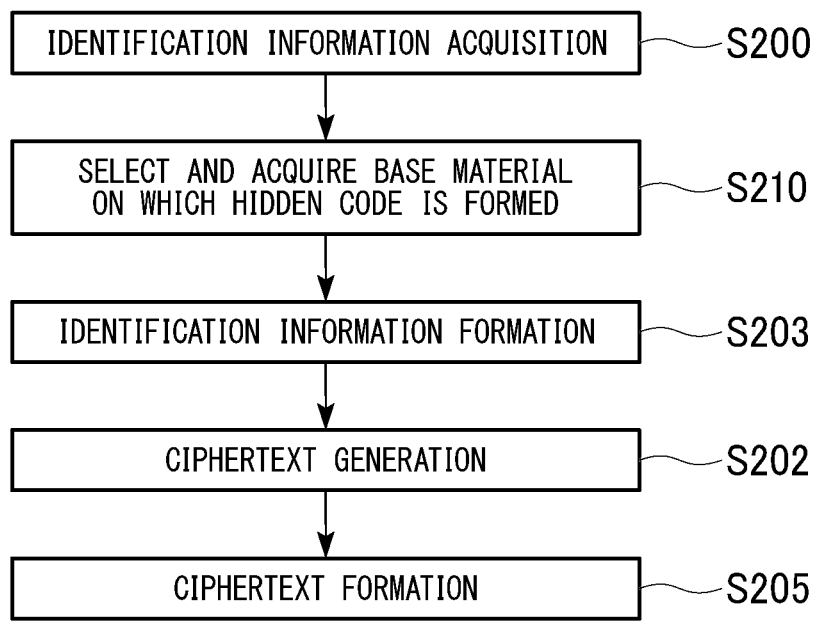
FIG. 7 is an example of a process flow related to a method for manufacturing the display body.

The flow shown in FIG. 7 shows an example of a procedure in the case of manufacturing the display body using a plurality of base materials prepared in advance.

The identification information is acquired in step S200, and then one of the plurality of base materials prepared in advance to produce the display body 100 is selected and acquired based on the acquired identification information in step S210. The hidden code obtained by encoding a part of the identification information is already formed in the second region of each of the plurality of base materials. That is, hidden codes contained in the plurality of base materials are associated with predetermined contents of a part of the identification information. For example, an example of the plurality of base materials includes a case where there are two types of base materials of "for Japanese" and "for non-Japanese", the character string "DOME" is formed as the hidden code in the second region of the base material for Japanese and the character string "INTE" is formed as the hidden code in the second region of the base material for non-Japanese. Accordingly, in step S210, the plurality of base materials are selectively acquired in association with a part of the identification information, and the hidden code is formed in the second region.

Subsequent steps are the same as those described in FIG. 6. As described above, the hidden code may be one of several patterns associated with a part of the identification information.

Figure 8A:
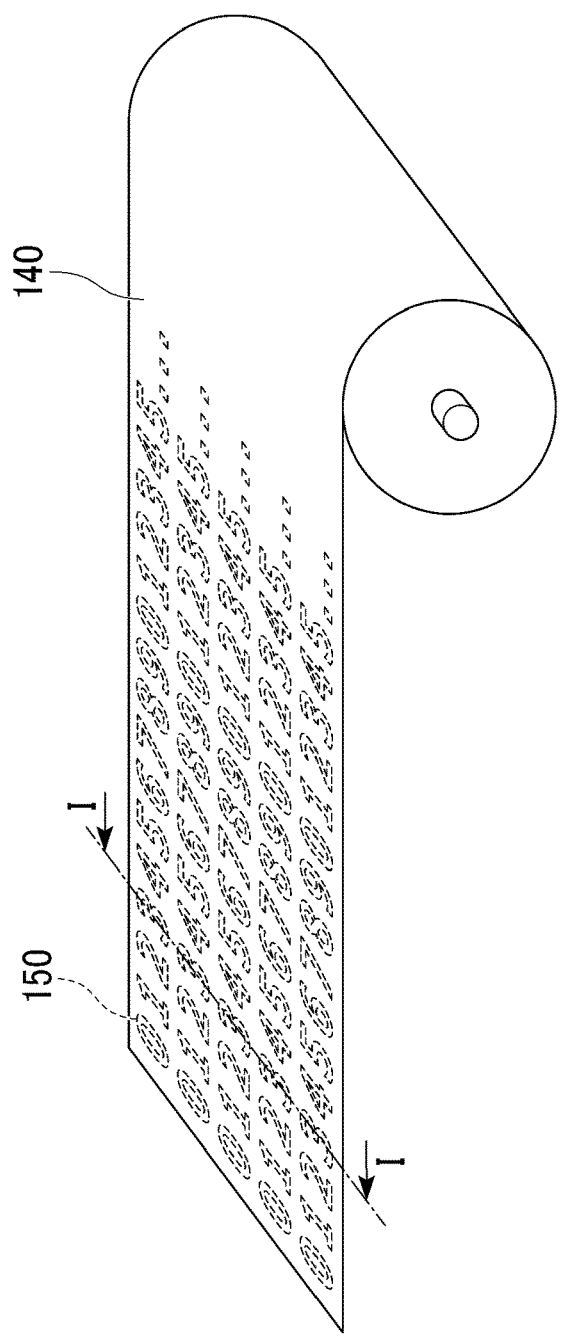
FIG. 8A is a perspective view of a hologram film.

FIG. 8A shows one aspect of steps S204 and S205. FIG. 8A shows a hologram transfer foil 140 in which a plurality of information elements 150 are formed as the hologram structure. In steps S204 and S205, the hologram transfer foil 140 is located above the display body, and the information element 150 corresponding to the content of the individual information to be recorded is selected and thermally transferred to the display body. In other words, as described above, the information element 150 of a hologram structure 142 that matches the ciphertext 25, the characters of the hidden code 22, and the position of the reproduction image of each character is selected and thermally transferred to the base material 30 to form the information element 150. Instead of direct thermal transfer of the information element 150 to the display body 100, the information element 150 may be thermally transferred to the intermediate transfer foil 31 described above. The code of the ciphertext 25 and the hidden code 22 can be formed as character strings having different positions of the reproduction images.

Figure 8B:
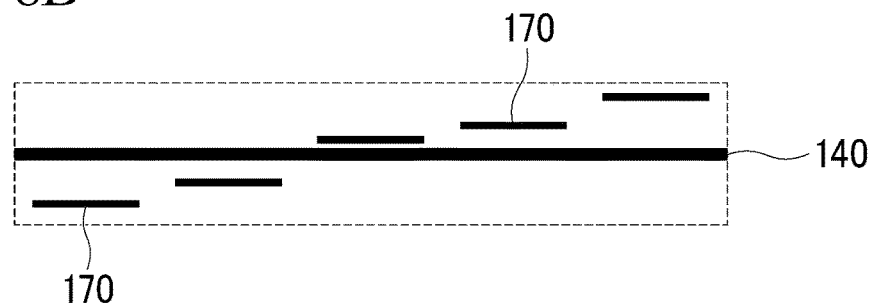
FIG. 8B is a cross-sectional view taken along a line I-I of FIG. 8A, which schematically shows positions of reproduction images.

FIG. 8B is a cross-sectional view taken along a line I-I of FIG. 8A. A plurality of identical information elements 150 are formed on the hologram transfer foil 140, but positions of reproduction images 170 of the plurality of information elements 150 are different from each other as shown in FIG. 8B. Therefore, the individual information including the plurality of identical information elements can be formed while the positions of the reproduction images are different.

Accordingly, it is possible to significantly increase an amount of information included in the hidden code and the ciphertext. For example, in a case where the numbers 0 to 9 are formed for three digits, the number of combinations is 10 cubed (1,000 ways). However, the number of selectable combinations increases by combining the positions of the reproduction images. For example, in a case where there are five patterns of the reproduction image positions as shown in FIG. 8B, the number of combinations is 50 cubed (125,000 ways), which is 125 times in the number of combinations. In a case where characters such as alphabets and symbols are included in addition to the numbers, the number of combinations can be further increased.

Accordingly, the number of information elements required for the hidden code 22 and the ciphertext 25 can be suppressed, and a degree of freedom in a layout of the display body and the manufacturing efficiency can be improved.

Figure 9A:
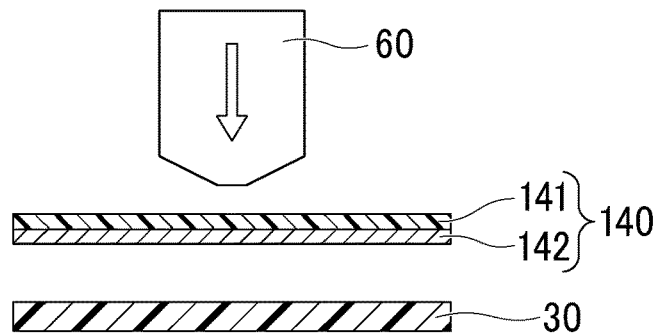
FIG. 9A is a schematic diagram showing a process of transferring an information element from the hologram film.
Figure 9B:
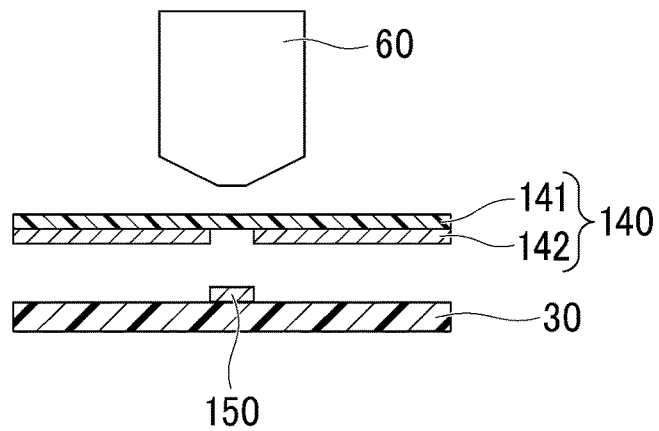
FIG. 9B is a schematic diagram showing the process of transferring the information element from the hologram film.

FIGS. 9A and 9B show a method for forming only a desired information element 150 from the hologram transfer foil 140 on the base material 30.

As shown in FIG. 9A, the hologram transfer foil 140 includes a carrier film 141 and a hologram structure 142 formed on the carrier film 141. An energy application unit 60 is brought into contact with a position of the desired information element 150 on the carrier film 141 with respect to the hologram transfer foil 140, and external energy is applied to the information element 150. In a case where an adhesive layer provided on the hologram structure 142 is activated by the external energy, the adhesive layer is bonded to the base material 30, and as shown in FIG. 9B, only the desired information element 150 is thermally transferred to the base material 30.

The energy application unit 60 may be a heat head or a laser head. The heat head may be a die head or a thermal head having a shape to be thermally transferred.

As another example, the hologram film that has been thermally transferred onto the base material once may be partially removed with a laser beam to form the information element. For example, numbers, alphabets, and the like can be formed by thermally transferring the hologram film having a display shape of 7 segments onto a base material and removing a predetermined segment. Further, the hologram film selectively thermally transferred from the hologram transfer foil may be further partially removed by the laser beam to form the information element.

A method for reading the information from the display body 100 will be described.

At least one of the code and the image of the identification information 21 recorded on the display body 100 is visible. Further, at least one of the code and the image of the identification information 21 recorded on the display body 100 is readable by a reading device. When the recorded hidden code 22 and ciphertext 25 are read, conditions for reading out the hidden code 22 and ciphertext 25 (light source information, light source and reading spectrum, reproduction position of the reproduction image to be read, and the like) are acquired, and all or a part of the hidden code 22 and the ciphertext 25 can be acquired based on the conditions.

In the reading, an information conversion program or an encryption process used when the ciphertext 25 is generated from the code of the identification information 21 or the hidden code 22 may be used. Alternatively, at least one of the code of the identification information 21 and the hidden code 22 may include the readout condition. Further, the ciphertext 25 may include the readout condition.

In order to acquire the reproduction image of the hologram structure formed in the second region 12 and the third region 13, a point light source or a laser light source corresponding to a predetermined reference light is required. The point light source may be an LED light source. The readout condition may include information on types of these light sources.

The authenticity verification of the display body can be performed based on the information read from the display body 100.

In a case where an observation device used for the authenticity verification is connected to a network, a combination of the acquired identification information 21, hidden code 22, and ciphertext 25 can be collated with a server, a database, or the like connected to the network to verify whether or not the display body is authentic. In other words, it is possible to collate and verify whether the acquired identification information 21, hidden code 22, and ciphertext 25 match with a server, a database, or the like connected to the network.

Alternatively, the observation device may receive and acquire the readout condition of the hidden code 22 and the ciphertext 25 by transmitting and collating the identification information 21 acquired by the observation device to the server or database via the network. Thereafter, the hidden code 22 and the ciphertext 25 acquired according to the readout condition are matched. This enables the authenticity verification. In this case, the readout conditions of the hidden code 22 and the ciphertext 25 used for the authenticity verification can be changed each time the verification is performed. Therefore, it is possible to further improve the security.

In a case where the observation device is not connected to the network, the combination of the identification information 21, the hidden code 22, and the ciphertext 25 may be stored in the observation device and collated in the observation device. However, in this case, in a case where the number of combinations becomes enormous, it may take a long time for collation or it may not be possible to store the combinations in the observation device. In addition, database maintenance is complicated since the maintenance is performed for each observation device.

In such a case, by associating the contents of the identification information with a reading condition of the hidden code 22 in advance, it is possible to omit the acquisition of the readout condition and shorten a time required for the authenticity verification.

Figure 10:
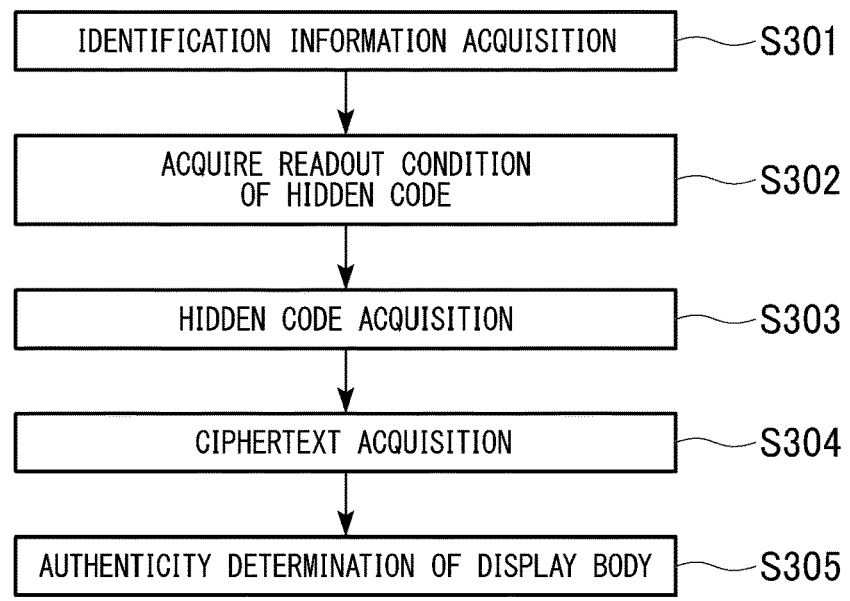
FIG. 10 is a flowchart showing a flow of authenticity verification of the display body.

FIG. 10 shows a flow according to an example of such a method for verifying the authenticity. In the display body according to this example, the identification information includes the three-character country code based on ISO 3166-1 alpha-3. The hidden code is a hologram structure with identical country codes as the reproduction images, and the reproduction images of the three-character information element are set at any of three types of positions Z1, Z2, or Z3 having different distances from the base material surface.

First, in step S301, the observation device reads the code of the identification information 21 in the first region 11 to acquire the country code.

Next, in step S302, the observation device refers to a stored table to acquire a reading position of the reproduction image of each character corresponding to the acquired country code as the readout condition. An example of the table is shown in Table 1.

TABLE 1

| Country Name | Country Code (ISO 3166-1 alpha-3) | Reading Position of First Character | Reading Position of Second Character | Reading Position of Third Character |
|---|---|---|---|---|
| Iceland | ISL | Z1 | Z1 | Z1 |
| Ireland | IRL | Z1 | Z1 | Z2 |
| Azerbaijan | AZE | Z1 | Z1 | Z3 |
| Afghanistan | AFG | Z1 | Z2 | Z1 |
| United States of America | USA | Z1 | Z2 | Z2 |
| . . . | . . . | . . . | . . . | . . . |

In step S303, the observation device acquires the reproduction images in the second region according to the readout condition acquired in step S302 and sets the acquired reproduction images as the hidden code 22.

For example, in a case where the country code acquired in step S301 is "IRL", in step S302, the readout condition of "Z1 for first character, Z1 for second character, Z2 for third character" is acquired based on the table in Table 1. In step S303, the observation device acquires the reproduction images at the positions defined in the readout condition. In a case where the display body is authentic, the reproduction image of each character is normally acquired. However, in a forged product in which all the reproduction images are located in Z1, the reproduction image of the third character is not acquired and the hidden code is incomplete.

In step S304, the ciphertext is acquired, and then, in step S305, whether or not the combination of the acquired identification information, hidden code, and ciphertext is appropriate, in other words, whether or not the acquired identification information, hidden code, and ciphertext match is collated with the information stored in the observation device to determine whether or not the display body is authentic. In the above case, in the forged product, the hidden code has only two characters of "IR" and is incomplete. Therefore, it is possible to determine that the display body is not authentic.

The determination in step S304 can be performed both online and offline. In a case of online, for example, the acquired identification information, hidden code, and ciphertext are transmitted from the observation device to the server or database via the network, and whether the combination of the identification information, the hidden code, and the ciphertext is appropriate, in other words, whether the identification information, the hidden code, and the ciphertext match can be checked on the server or database. In a case of offline, a list of country names and country codes as shown in Table 1 is recorded on the observation device. First, the observation device acquires the nationality as the identification information from the display body and acquires the reading position of each character of the country code from the list based on the acquired nationality information. Thereafter, in the observation device, the country code as the hidden code is read and acquired from the display body, and the acquired hidden code can be collated with the list to check whether the identification information and the hidden code match. Further, the authenticity of the display body can be verified based on whether or not the data obtained by decrypting the ciphertext is identical to all or a part of at least one of the identification information code and the hidden code. Further, the authenticity of the display body may be verified based on whether or not the data obtained by decrypting the ciphertext is identical to the hidden code. For this decryption, the public key is used in a case of the public key cryptosystem, and the common key is used in a case of the common key cryptosystem. In a case of the hybrid of thereof, the public key and the common key are used. In step S304, the forensic verification is performed. Since the hidden code is recorded on the hologram film or by the security printing, the tampering thereof is difficult. In addition, since an encryption algorithm and an encryption key are required to match the hidden code with the ciphertext, two-element verification using possession information and encryption is possible. A decryption key may include an owner's PIN. Further, when the ciphertext is encrypted, double encryption may be performed by both encryption using a specific encryption key and encryption using the owner's PIN. The cryptosystem using the owner's PIN may be the common key system. As described above, the display body 100 is authenticatable at a high level. Further, in a case where the image of the owner's identification information is formed on the display body 100, the image can be compared with the owner. In particular, in a case where a face image is formed as the image, it is easy to compare the owner with the display body 100. Further, in a case where the face image is formed by the hologram, it is difficult to forge the face image itself as well as the comparison between the owner and the display body 100. Therefore, impersonation can be prevented.

Figure 11A:
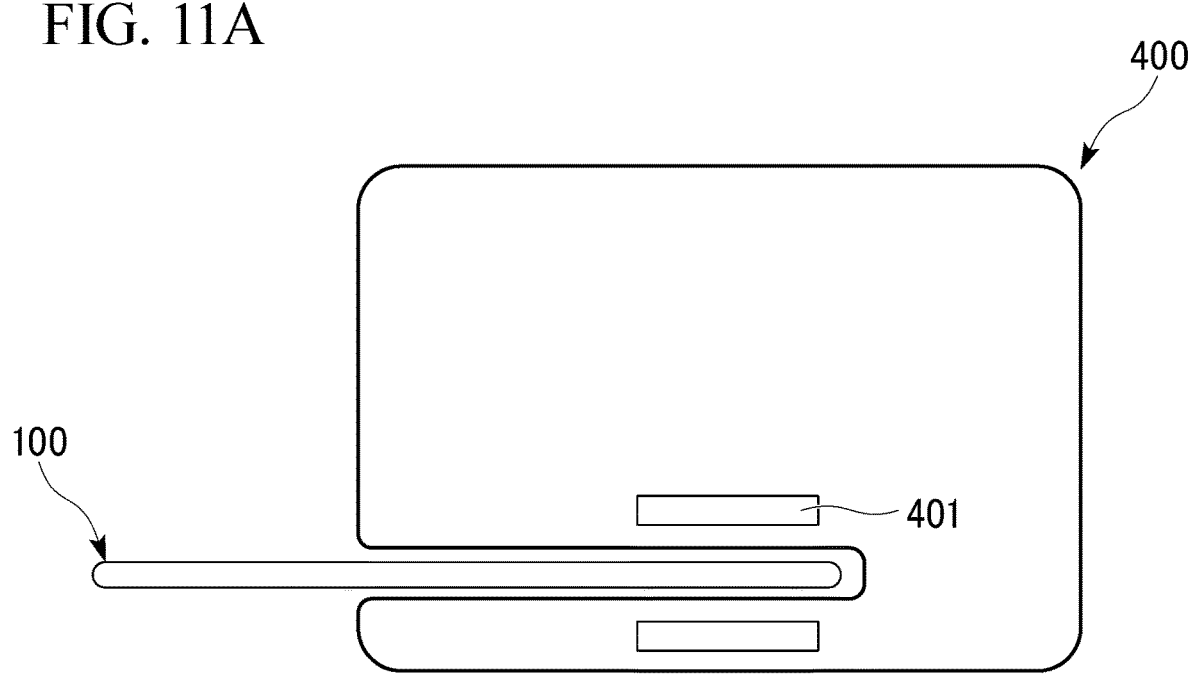
FIG. 11A is a schematic diagram showing an observation device for the display body.
Figure 11B:
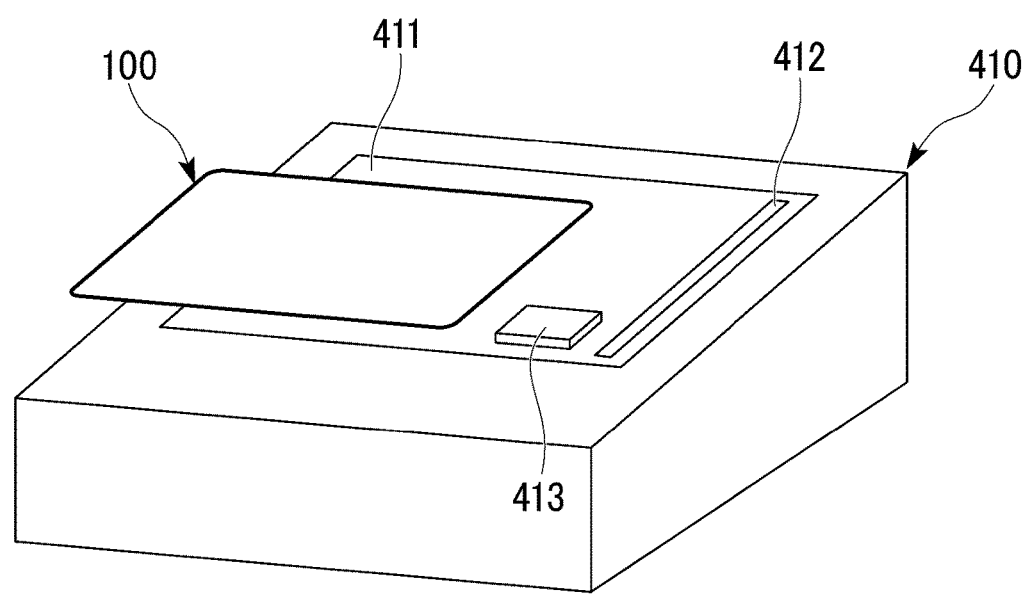
FIG. 11B is a schematic diagram showing an observation device for the display body.

An observation device suitable for observing the display body of the present embodiment will be described. The observation device is a reader that reads the code. An observation device 400 shown in FIG. 11A is a type of observation device in which the display body 100 is inserted and read. The observation device 410 shown in FIG. 11B is a type of observation device in which the display body 100 is read on a scanner surface 411.

The observation device 400 includes an optical sensor 401 that acquires the reproduction images of the hidden code 22 and the ciphertext 25. The observation device 410 includes an optical sensor 413 that acquires the reproduction images of the hidden code 22 and the ciphertext 25. The optical sensors 401 and 413 are configured to be movable within the observation device and can be moved to positions corresponding to the second region 12 and the third region 13.

A plurality of optical sensors may be provided in the observation device, and the second region 12 and the third region 13 each may be read by dedicated optical sensors.

Since the observation device 410 includes a line scanner 412 that acquires the identification information 21, all the identification information 21, the hidden code 22, and the ciphertext 25 can be acquired at once by placing the display body 100 on the scanner surface 411 and operating the line scanner 412.

The display body of the present invention will be further described using an experimental example.

Experimental Example

A hologram structure is calculated by a computer hologram such that three characters "A", "B", and "C" each are reproduced at positions 5 mm, 7 mm, and 9 mm with an interface of the hologram film as a reference, and a hologram transfer foil subjected to embossing molding with the hologram structure is produced. The reference light is green light.

The produced hologram transfer foil is thermally transferred to a polycarbonate resin sheet, and hot laminating is performed on a plurality of laminated polycarbonate resin sheets to produce a pre-display body having a base material containing a hologram film as a hidden code.

Laser engraving is performed on the pre-display body using an infrared laser beam having a wavelength of 1064 nm to produce two display bodies in which information of a person A and information of a person B each are formed as identification information. A readout condition for the hidden code in a display body A, in which the information of the person A is recorded, is "red light source, reproduction position 9 mm", and a readout condition for the hidden code in a display body B, in which the information of the person B is recorded, is "green light source, reproduction position 7 mm".

With a combination of a full-color LED light source, an optical prism, and a CMOS sensor, an observation device is produced in which light of the light source is perpendicularly incident on the display body to form a reproduction image of the hologram film on the CMOS sensor.

When the hidden code is acquired according to the readout condition using the observation device, the hidden code is not acquired in the display body A. This is because the position of the reproduction image of each character changes due to the red light, and a reproduction image existing at the position of 9 mm disappears.

On the other hand, in the display body B, only a reproduction image of "B" located at 7 mm is acquired.

In a case where second regions of the display bodies A and B are visually observed, all reproduction images of "A", "B", and "C" can be visually recognized. Therefore, a person who intends to perform forgery or tampering cannot know whether all of "A", "B", and "C" are used for authenticity verification, or only a part of "A", "B", and "C" is used. Further, in a case where the above readout condition changes, the reproduction image acquired by the observation device also changes. Therefore, it is impossible to perform the forgery that can withstand the authenticity verification unless a correct readout condition is known.

This experimental example shows that the hidden code can be suitably formed by using the hologram structure having different reproduction positions and a ciphertext can be suitably recorded as a code.

Although one embodiment and the example of the present invention have been described in detail with reference to the drawings, the specific configuration is not limited to the present embodiment. Changes, combinations, and the like of configurations within a scope not departing from the gist of the present invention are also included.

Further, the scope of the present disclosure is not limited to the embodiments shown and described, but may include all embodiments that provide effects equal to those intended by the present invention. Furthermore, the scope of the present disclosure is not limited to the features of the invention defined by the claims, but includes all the disclosed features and any combination of the features.

The terms "portion", "element", "region", "area", "layer", "surface", "display body", "item", "record", "medium", "base material", "printing", and "engraving" used in the present disclosure are physical entities. The physical entity may refer to a physical form or a spatial form surrounded by a substance. The physical entity may be characterized by material, physical property, physical quantity, psychophysical quantity, disposition, shape, outer shape, above statistics, recorded information, recorded data, recorded code, readable information, readable data, readable code, ability, performance, appearance, color, spectrum, image to be formed/displayed, process method, detection method, verification method, and determination method of the physical entity. The physical entity can have a specific function due to the characteristics of the physical existence. A set of physical entities having the specific function can exhibit a synergistic effect due to each function of each physical entity.

In a case where the terms, configurations, features, aspects, and embodiments are interpreted, the drawings should be referred to as necessary. Matters that can be directly and uniquely derived from the drawing should be the basis for the amendment, as well as the text.

The terms used in the present disclosure and in particular claims are generally intended as "open" terms (for example, the term "have" should be interpreted as "at least have" and the term "include" should be interpreted as "include but not limited thereto"). Further, in a case where the claims do not explicitly describe a specific number, there is no intent for the specific number. For example, for facilitating understanding, the scope of claims may include the use of "at least one" and "one or more" introductory phrases, and may introduce an enumeration of claims. However, the use of such a phrase should not be interpreted to mean that a particular claim including a claim that introduces a description of the indefinite article "a" or "an" is limited to embodiments including only one such description. The phrase "one or more" or "at least one" and the indefinite article such as "a" or "an" should be interpreted to mean at least ("one" or "one or more").

INDUSTRIAL APPLICABILITY

With the above display body, the individual information obtained by visual observation by a human and the individual information obtained by the reading device may be the same or different. Therefore, the display body can be used as the optical effect for anti-forgery, the reading device, and the authenticity verification method. In particular, the display body can be used as a display body to protect the value and information contained in items such as personal authentication media, such as a passport, driver's license, and ID card in which the individual information is used. Further, since there is the individual information that can be acquired only through the reading device, the display body can also be used for the personal information and a machine authentication system linked with the individual information.

The display body of the present invention can suitably prevent the tampering and the forgery with the simple configuration.

What is claimed is:

1. A method for manufacturing a display body including a base material, the method comprising:
    generating a hidden code from identification information;
    encrypting the hidden code and generating a ciphertext;
    forming at least one of a code and an image of the identification information on the base material by at least one of thermal transfer and laser engraving;
    forming the hidden code on the base material by thermal transfer or security printing; and
    recording the ciphertext on the base material by at least one of thermal transfer and laser engraving, wherein
    the hidden code is formed by applying external energy to a hologram transfer foil having a hologram structure and thermally transferring a hologram film to the base material,
    a plurality of hologram structures are transferred, and
    a position of at least one reproduction image of the hologram structure in a direction perpendicular to the base material is different from positions of other reproduction images in the direction perpendicular to the base material.

2. A method for manufacturing a display body, the method comprising:
    acquiring a code of identification information and a hidden code;
    encrypting at least one of the code of the identification information and the hidden code and generating a ciphertext;
    forming at least one of the code and an image of the identification information on a base material by at least one of thermal transfer and laser engraving;
    forming the hidden code on the base material by transfer or security printing; and
    recording the ciphertext on the base material by at least one of transfer and laser engraving, wherein
    the hidden code is formed by applying external energy to a hologram transfer foil having a hologram structure and thermally transferring a hologram film to the base material,
    a plurality of hologram structures are transferred, and
    a position of at least one reproduction image of the hologram structure in a direction perpendicular to the base material is different from positions of other reproduction images in the direction perpendicular to the base material.

3. The method for manufacturing a display body according to claim 1,
    wherein the identification information is formed by applying external energy to an information element having a hologram structure and thermally transferring to the base material.

4. The method for manufacturing a display body according to claim 1,
    wherein an information element having a hologram structure is thermally transferred to an intermediate transfer foil to form the ciphertext, and
    the intermediate transfer foil is bonded to the base material.

5. A display body comprising:
    a base material having a first region, a second region, and a third region,
    wherein at least one of a code and an image of identification information is formed in the first region,
    a hidden code containing information obtained by encoding at least a part of the identification information is formed in the second region,
    an encrypted ciphertext is recorded in the third region, and
    the encrypted ciphertext is generated from at least one of the code of the identification information and the hidden code, wherein
    at least one of a plurality of information elements constituting the hidden code or the encrypted ciphertext has a hologram structure,
    a plurality of hologram structures are provided,
    each of reproduction images of the plurality of hologram structures is located at a position separated from a surface of the base material, and
    a position of at least one reproduction image of the plurality of hologram structures in a direction perpendicular to the base material is different from positions of other reproduction images in the direction perpendicular to the base material.

6. The display body according to claim 5,
    wherein the first region and at least one of the second region and the third region overlap in a plan view.

7. The display body according to claim 5,
    wherein the identification information is directly formed on the base material.

8. The display body according to claim 5,
    wherein at least one of a plurality of information elements constituting the hidden code or the encrypted ciphertext is directly formed on the base material.

9. The display body according to claim 5,
    wherein the hologram structure is disposed inside the base material.

10. The display body according to claim 5,
    wherein the hologram structure is disposed on a surface of the base material.

11. The display body according to claim 5,
    wherein the hidden code includes any one of a country code, a geographic code, a gender code, a language code, and a currency code.

12. The display body according to claim 5,
    wherein the hidden code is disposed inside the base material.

13. A method for verifying authenticity of the display body according to claim 5, the method comprising:
    acquiring the identification information and the hidden code from the display body; and
    verifying whether or not the display body is authentic from the acquired identification information and hidden code.

14. The method for verifying authenticity of the display body according to claim 13, further comprising:
   acquiring the encrypted ciphertext from the display body; and
   verifying whether or not the display body is authentic based on whether or not the acquired identification information and hidden code are identical to information decrypted from the encrypted ciphertext.

15. The method for verifying authenticity of the display body according to claim 13, further comprising:
   acquiring the encrypted ciphertext from the display body; and
   verifying whether or not the display body is authentic based on whether or not data decrypted from the encrypted ciphertext has at least one of the acquired identification information and hidden code.

16. The method for verifying authenticity of the display body according to claim 13,
   wherein the hidden code is recorded by a hologram film,
   a readout condition of the hidden code is acquired from the acquired identification information, and
   the hidden code is acquired according to the readout condition.

* * * * *